Aug. 26, 1924.　　　　　　　　　　　　　　　　　　1,506,479
E. W. GOESER ET AL
COMBINED BRAKE AND SPOOLING DRUM
Filed March 29, 1924　　2 Sheets-Sheet 1

INVENTORS:
EDWIN W. GOESER,
WILLIAM D. DAVIDSON,
BY
Graham + Harris
ATTORNEYS.

Aug. 26, 1924.
E. W. GOESER ET AL
1,506,479
COMBINED BRAKE AND SPOOLING DRUM
Filed March 29, 1924    2 Sheets-Sheet 2
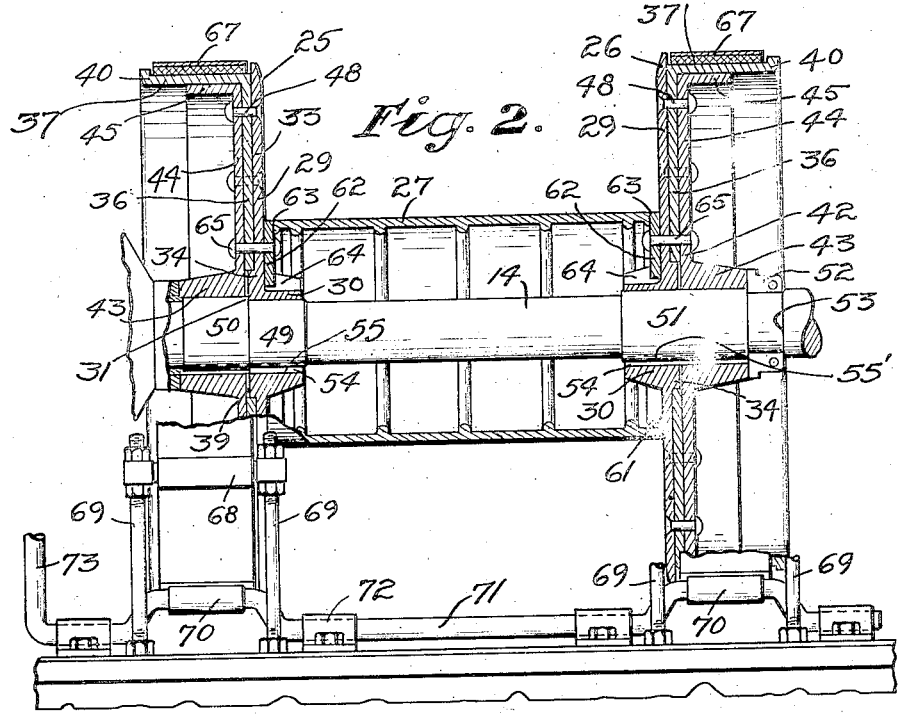
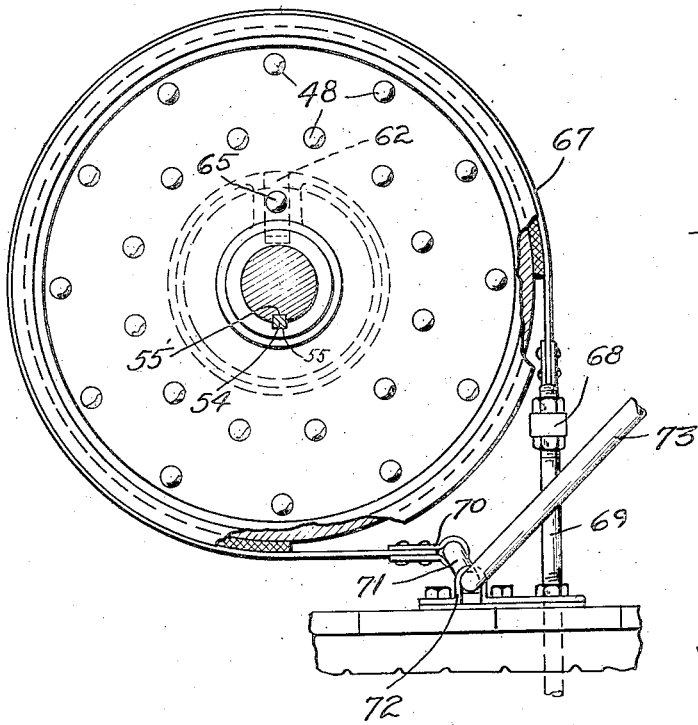
INVENTORS:
EDWIN W. GOESER,
WILLIAM D. DAVIDSON,
BY
ATTORNEYS.

Patented Aug. 26, 1924.

1,506,479

UNITED STATES PATENT OFFICE.

EDWIN W. GOESER AND WILLIAM D. DAVIDSON, OF LOS ANGELES, CALIFORNIA, ASSIGNORS TO EMSCO TOOL CO., A CORPORATION OF CALIFORNIA.

COMBINED BRAKE AND SPOOLING DRUM.

Application filed March 29, 1924. Serial No. 702,791.

*To all whom it may concern:*

Be it known that we, EDWIN W. GOESER and WILLIAM D. DAVIDSON, both citizens of the United States, residing at Los Angeles, in the county of Los Angeles, State of California, have invented a new and useful Combined Brake and Spooling Drum, of which the following is a specification.

This invention relates to an improved construction of combined brake and spooling drums especially suitable for use in rotary draw works, or hoists such as are employed in the oil producing industry.

In the oil producing industry hoists are used when the string being handled is short or light, one advantage of the hoist over the pulley block being that the pulling speed may ordinarily be about double. The elevating cable is secured to the drum of the hoist and is wound thereon, and, because of the great weight of the string being handled, it is necessary that the drum be of sturdy construction and it must have a brake adapted to endure considerable strain.

It is an object of our invention economically to provide brake wheel constructions which shall have very great strength, and we may accomplish this by securing a brake rim between two flange members, both of which may be keyed to the drum shaft. The rivets or bolts used for securing the brake rim may thus be subjected to double shear and nevertheless rendered readily accessible.

To gain strength, to minimize costs, and to facilitate transport and assembly, it is desirable to make the brake wheel and spooling drum in separate parts, which may be assembled on the job.

When spooling back and forth on the drum, there is a tendency for a spreading of the assembled parts; and it is another object of our invention to provide a brake wheel and spooling drum assembly which will not spread during spooling operations. We may accomplish this by providing the drum shaft with a shoulder against which one of a pair of brake wheels engages. The other brake wheel may be retained in place by a collar which may rest in a recess in the drum shaft. The spooling drum is arranged to be held between the brake wheels, which may be keyed to the shaft and held between the shoulder and the collar.

It is also an object of our invention to provide a brake wheel construction which allows the brake rim to be removable without disturbing the spooling drum.

Additional objects of our invention and the advantages thereof will be evident hereinafter.

Referring to the drawings, which are included for illustrative purposes,

Fig. 2 is a longitudinal section through the brake wheel and spooling drum of the hoist shown in Fig. 1, this view showing very clearly the features of our invention.

Fig. 3 is an end view of one of the brake wheels with parts broken away.

Figure 1:
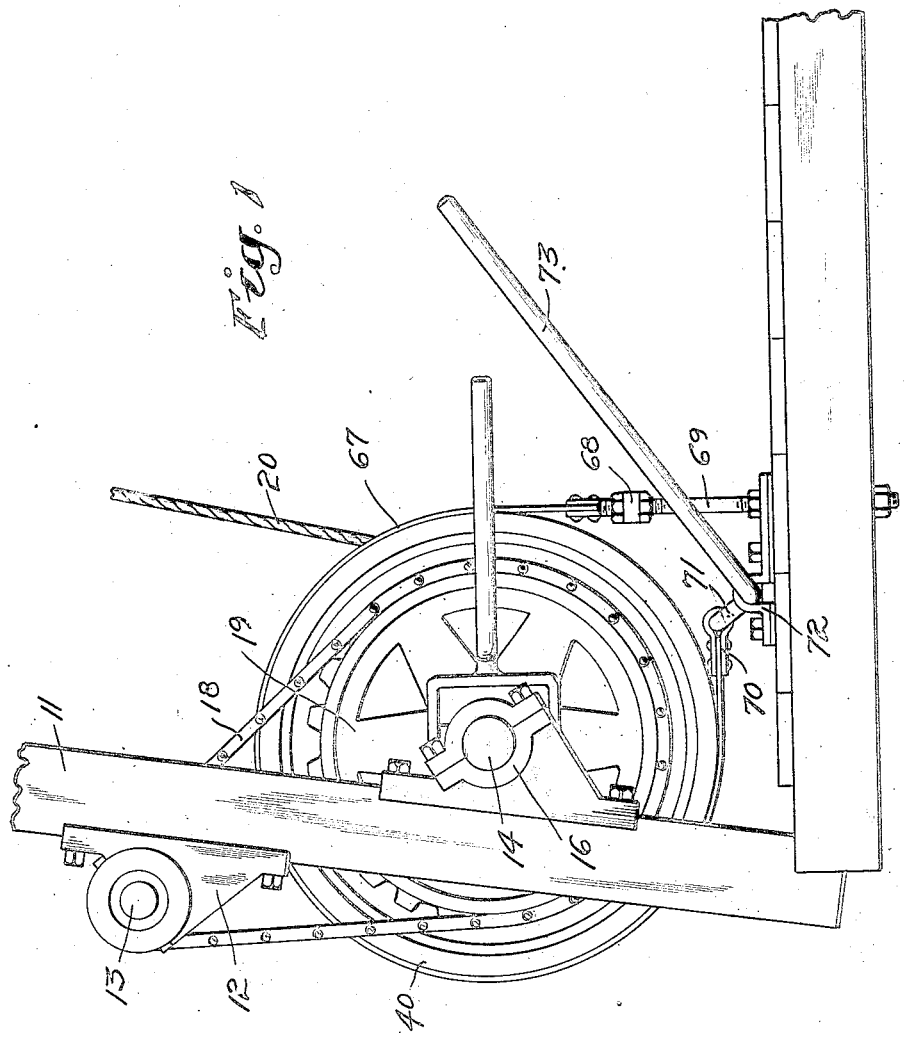
Fig. 1 shows a side elevation of a rotary hoist in which essential features of our invention may be incorporated.

As shown in Fig. 1 of the drawings, a draw works or hoist employing a brake wheel and spooling drum and including the features of this invention may comprise "uprights" 11, which may carry suitable bearings 12 for rotatably supporting a counter shaft 13. A drum shaft 14 may be rotatably mounted in the bearings 16 which are shown as secured to the uprights 11 in a position below the counter shaft 13. In the usual construction the counter shaft 13 is arranged to rotate the drum shaft 14 through a suitable chain 18 which rotates the drum shaft through the sprocket 19, a clutch being interposed; and, mounted on the drum shaft 14, there may be a combined brake wheel and spooling drum construction, by which the cable 20 may be spooled.

As shown in Figs. 2 and 3, a brake wheel and spooling drum construction illustrating our invention may comprise a pair of brake wheels 25 and 26, between which a spooling drum 27 may be supported; and each of the brake wheels may comprise a cast external flange 29 integral with a hub section 30, which hub is arranged to fit on the shaft 14, as shown.

The hub section 30 of the external flange of the brake wheel 25 may be arranged to fit against a shoulder such as is indicated at 31. Formed on the outer face of each external flange 29 is shown a centralizing boss 34, corresponding in thickness to a retaining plate or web 36, which may be of press-forged steel and may be integral with a brake rim 37; and each of the protuberances or bosses 34 extends through and exactly fit within a central opening 39, formed in a web 36. At the outer edge of each brake drum comprising a web 36 and a rim 37, we may provide a shoe-retaining flange 40, extending radially, as shown.

Outside of each of the external flanges 29 we propose to use an internal flange 42, which may advantageously be formed of cast iron or steel and may comprise a hub section 43 and a radial web 44, the latter extending from the hub section 43 along the face of the intermediate web 36. A subsidiary or secondary rim 45 is provided at the outer part of each of the webs 44 to support the mentioned rims 37 of the respective brake drums, so that the cylindrical portion of each brake drum may comprise a forging supported by a casting of any necessary strength, substantially as shown in Fig. 2. Any suitable means such as bolts or the rivets 48 may be provided for securing the intermediate webs 36, shown as integral with rims 37, between corresponding external and internal flanges 29 and 44. As will be seen in Fig. 2, the hub section 30 of the external flange 29, which forms a part of the brake wheel 25, rests on and interfits with a portion 49 of the shaft 14 and the hub 43 may rest on an enlarged portion 50 to provide the mentioned shoulder 31, serving as an abutment to prevent longitudinal movement; whereas the hubs 30 and 43 of the external and internal flanges 29 and 42 of the brake wheel 26 may rest on a uniform portion 51 of the shaft 14. Engaging the outer face of the hub section 43 of the brake wheel 26 is shown a split collar 52, which may be retained in an annular recess 53 of the shaft 14, as shown, to constitute an abutment cooperative with the shoulder 31 in preventing spread. The brake wheels 25 and 26 may be secured to the shaft 14 by means such as the keys 54, which may extend into the slots 55 formed in the hub sections 30 and 43, and into corresponding slots 55 in the shaft 14.

The drum 27 is arranged to be rigidly retained between the brake wheels 25 and 26; and our preferred construction for this purpose may comprise an annular and continuous or interrupted bead or ledge 61, formed on the adjacent faces of the external flanges 29. Any required number of keys 62 may be provided for preventing the rotation of the drum 27 relatively to the brake wheels 25 and 26. These keys 62 are shown as located in slots 63 formed in the drum 27 and slots 64 provided in the hub sections 30. The keys 62 may be secured in place by means of bolts or rivets 65.

Braking force may be applied to the brake drum by means such as the bands 67, shown as extending around the braking flanges 37. At one end, the bands 67 may be adjustably secured, as at 68, to rods 69, and the other ends of the bands 67 may be secured, as at 70, to a brake lever 71, which is shown as extending through the brackets 72, and as provided with an operating arm 73.

In a drill rig, the force applied by the brake band on the brake wheel must be very great, to prevent slippage of the drum. To endure this great strain, our invention comprises a rugged brake rim 37, preferably integral with a web which is secured between flanges 33 and 44 by any desired number of suitable bolts or rivets 48; these elements being subjected to double shear. When the brake rims 37 become sufficiently worn to warrant replacing, these rims may be removed without disturbing the drum 27, and upon removing only the internal flanges 42.

During spooling back and forth on the drum, there is a tendency for the cable, as it approaches the brake wheels, to force them outwardly. By our provision of the shoulder 31 and the collar 52, we render it practically impossible for the cable to spread the parts outwardly.

Although we have above described one complete embodiment of our invention, it should be understood that various features thereof may be independently employed, and also that various modifications may be made by those skilled in the art, without the slightest departure from the spirit or the scope of our invention, as the same is indicated above and in the following claims.

We claim as our invention:

1. In a combined brake and spooling drum organization comprising means for connecting a shaft with a brake drum, the combination of: a web carrying a brake rim, and a pair of flanges engaging opposite sides of said web.

2. In a combined brake and spooling drum organization comprising means for connecting a shaft with a brake drum, the combination of: a web carrying a brake rim, a pair of flanges engaging opposite sides of said web, and securing means extending through said web and said flanges.

3. In a combined brake and spooling drum organization comprising means for connecting a shaft with a brake drum, the combination of: a web carrying a brake rim, a pair of flanges engaging opposite sides of said web, and securing means extending through said web and said flanges and thereby placed in double shear.

4. In a combined brake and spooling drum organization comprising means for connecting a shaft with a brake drum, the combination of: a web carrying a brake rim, and a pair of flanges engaging opposite sides of said web, said rim and web being press-forged.

5. In a combined brake and spooling drum organization comprising means for connecting a shaft with a brake drum, the combination of: a web carrying a brake rim, and a pair of flanges engaging opposite sides of said web, said rim and web being press-forged and one of said flanges being of cast metal.

6. In a combined brake and spooling drum organization comprising means for connecting a shaft with a brake drum, the combination of: a web carrying a brake rim, and a pair of flanges engaging opposite sides of said web, each of said flanges being secured to a hub section.

7. In a combined brake and spooling drum organization comprising means for connecting a shaft with a brake drum, the combination of: a web carrying a brake rim, and a pair of flanges engaging opposite sides of said web, each of said flanges being secured to a hub section, one of said flanges being provided with a boss to facilitate centering of said web.

8. In a combined brake and spooling drum organization comprising means for connecting a shaft with a brake drum, the combination of: a web carrying a brake rim, and a pair of flanges engaging opposite sides of said web, one of said flanges being provided with a subsidiary rim supporting said brake rim.

9. In a combined brake and spooling drum organization comprising means for connecting a shaft with a brake drum, the combination of: a web carrying a brake rim, a pair of flanges engaging opposite sides of said web, a shoulder on said shaft, and a hub section rigidly connected with one of said flanges and abutting said shoulder.

10. In a combined brake and spooling drum, the combination of: a shaft, brake wheels thereon comprising hub sections secured against rotation on said shaft, flanges rigidly connected with said hub sections, brake rims secured to said flanges, and a spooling drum supported between said brake wheels.

11. In an organization as described in claim 10, restraining means on said shaft for preventing longitudinal movement of said hubs.

12. In an organization as defined in claim 10, means for preventing a spreading movement of said flanges.

13. In an organization as defined in claim 10, means for supporting said spooling drum from said flanges.

14. In an organization as defined in claim 10, means for compelling said spooling drum to rotate with said shaft.

15. In an organization as defined in claim 10, means for compelling said spooling drum to rotate with said shaft, said last mentioned means comprising keys engaging said hubs and said drum.

16. In an organization as defined in claim 10, means for compelling said spooling drum to rotate with said shaft, said last mentioned means comprising keys engaging said hubs and said drum and extending through said flanges.

17. In a construction of the class described, the combination of: a shaft; a pair of brake wheels mounted on said shaft; a spooling drum supported between said brake wheels; a shoulder formed on said shaft engaging one of said brake wheels; and a collar arranged to engage the other of said brake wheels, said shoulder and said collar arranged to prevent the spreading of said construction.

18. In a construction of the class described, the combination of: a shaft; a pair of brake wheels mounted on said shaft, each of said brake wheels providing two annular flanges; a spooling drum supported on said annular flanges between said brake wheels; a shoulder formed on said shaft engaging one of said brake wheels; and a collar arranged to engage the other of said brake wheels, said shoulder and said collar arranged to prevent the spreading of said construction.

19. In a construction of the class described, the combination of: a shaft; a pair of brake wheels mounted on said shaft; a spooling drum supported between said brake wheels; a shoulder formed on said shaft engaging one of said brake wheels; and a collar resting in an annular recess provided in said shaft arranged to engage the other of said brake wheels, said shoulder and said collar arranged to prevent the spreading of said construction.

20. In a construction of the class described, the combination of: a shaft; a pair of brake wheels arranged on said shaft, each comprising an external flange, an internal flange, and a brake rim secured by a web extending between said external and internal flanges; means for keying said external and said internal flanges to said shaft; a spooling drum supported between said brake wheels; a shoulder formed on said shaft and arranged to engage one of said brake wheels; and a collar disposed in a recess formed in said shaft and arranged to engage the other of said brake wheels, said shoulder and said collar being arranged to prevent spreading.

21. In a construction of the class described, the combination of: a shaft; a pair of brake wheels arranged on said shaft, each comprising an internal flange integral with a hub section disposed on said shaft, an external flange also integral with a hub section disposed on said shaft, a brake rim, and means for securing said brake rim to said internal and external flanges in such a manner that the securing elements shall be subjected to double shear; means for keying said external and said internal flanges to said shaft; a spooling drum supported between said brake wheels; a shoulder formed on said shaft and arranged to engage one of said brake wheels; and a collar disposed in a recess formed in said shaft and arranged to engage the other of said brake wheels, said shoulder and said collar being arranged to prevent spreading.

In testimony whereof, we have hereunto set our hands at Los Angeles, California, this 17th day of March, 1924.

EDWIN W. GOESER.
WILLIAM D. DAVIDSON.